Sheet.1. 2 Sheets.

A. J. Preston,
Hay Rake and Loader.

N° 75,790. Patented Mar. 24. 1868.

Witnesses.
N. J. Campbell.
Edw Schopr.

Inventor.
A. J. Preston
by
Mason Fenwick & Lawrence

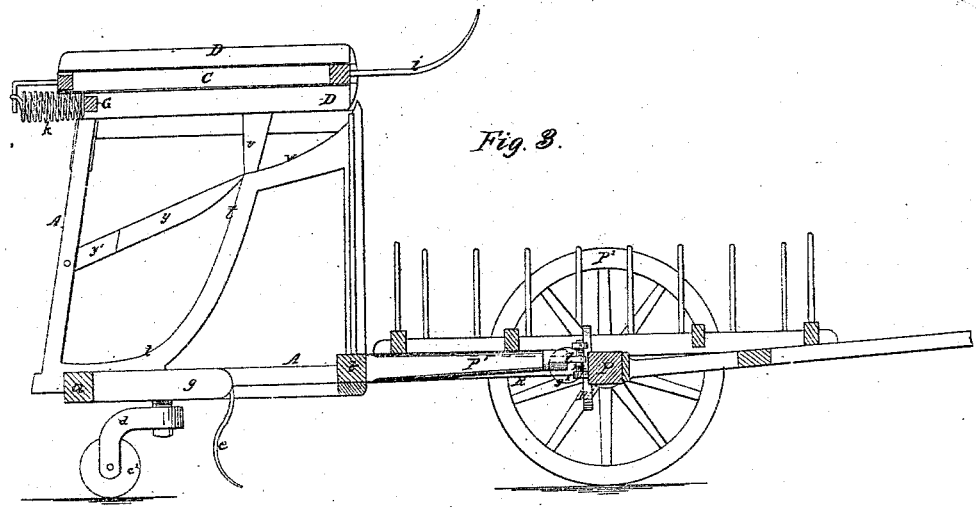

United States Patent Office.

A. J. PRESTON, OF GUILFORD, NEW YORK.

Letters Patent No. 75,790, dated March 24, 1868.

IMPROVEMENT IN HAY-RAKERS AND LOADERS.

The Schedule referred to in these Letters Patent and making part of the same.

TO ALL WHOM IT MAY CONCERN:

Be it known that I, A. J. PRESTON, of Guilford, in the county of Chenango, and State of New York, have invented a new and improved Hay-Raker and Loader; and I do hereby declare that the following is a full, clear, and exact description thereof, reference being had to the accompanying drawings, making part of this specification, in which—

Figure 2:
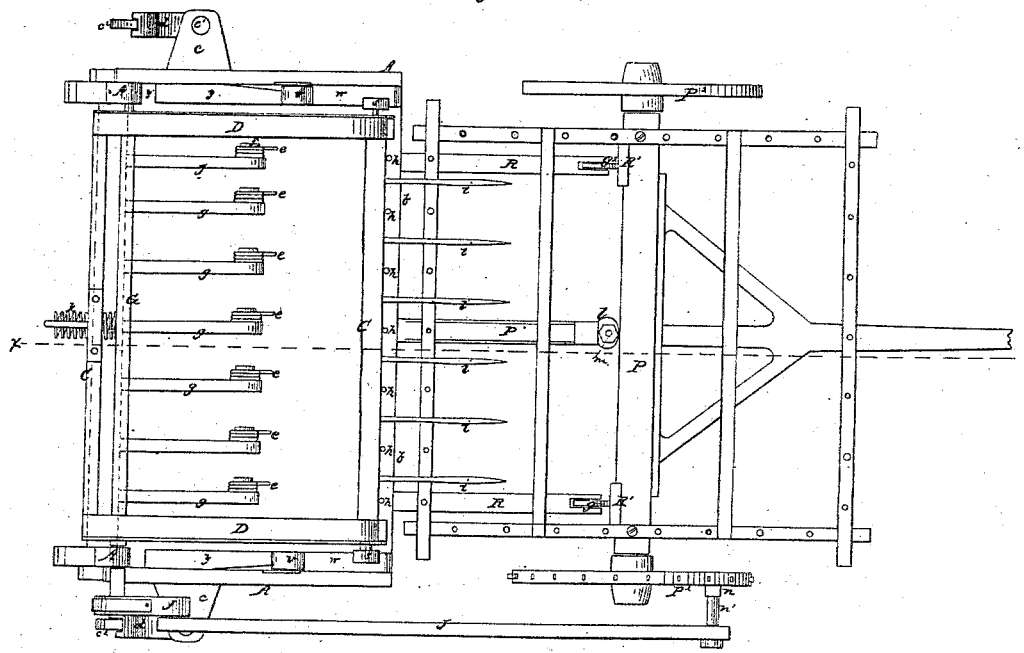
Figure 2 is a top view of the same parts.

Figure 3, sheet 2, is a longitudinal section, taken in a vertical plane through the centre of the machine, as indicated by red line X in fig. 2.

Figures 4 and 5 are side elevations of the raker and loader, showing the vibrating-fork in the act of ascending, and also in the act of descending.

Figure 6 is a sectional view of the clamp and wrist-pin, which can be applied to the spokes of a common wagon or cart-wheel, so as to make such wheel a driver for the fork.

Similar letters of reference indicate corresponding parts in the several figures.

This invention relates to certain new and useful improvements on that class of machines which are designed for raking up hay scattered upon the ground or in windrows, and delivering it upon a wagon or cart attached to the raking and loading-devices.

The nature of my invention consists in so constructing, guiding, and operating a vibrating-fork, and combining it with a hay-rake and a clearer, that said fork will automatically remove the hay gathered by the rake from this rake, elevate the hay thus removed to a proper height, and then, with the aid of the clearer, deliver it upon a wagon or carriage, to which the above-named devices are attached, as will be hereinafter described.

The invention further consists in providing, in a novel manner, for attaching hay-raking and loading-devices to a common cart or wagon for receiving the gathered hay, so that one of the transporting-wheels of such vehicle shall serve as a driver for operating said devices, and also so that the frame carrying the raking and loading-devices shall be held in line with the wagon, but allowed to accommodate itself to the undulations of the ground, as will be hereinafter described.

To enable others skilled in the art to understand my invention, I will describe its construction and operation.

The frame, which is adapted for receiving and carrying the raking and loading-devices, consists of two vertical sides, A A, constructed alike in every particular, and secured together at their lower ends, at a suitable distance apart, by means of horizontal transverse beams $a$ and $b$, which may be made of wood or of metal. The sides A A of the frame I prefer to make of metal, for reasons which will hereinafter appear.

From each side, A, of the frame is a horizontal offset, $c$, through which a hole is made vertically for receiving a screw-standard, $c^1$, of a caster-wheel, $c^2$. The curved arms, $d$, of the caster-wheels $c^2$ are applied so as to turn freely around the lower ends of their respective standards $c^1$, while the latter remain fixed. By thus making the standards of the caster-wheels screws, and tapping them through the offsets $c\ c$, it will be seen that, by adjusting these screws, the frame of the machine can be raised or depressed, and set so as to run at any desired distance from the ground. This vertical or bodily adjustment is required where the rake-teeth are not adjustable, for the purpose of setting the points of these teeth to run nearer to or further from the ground, according to the condition of the stubble.

The rake-teeth $e$, which gather the hay from the ground, are spring-metal rods, suitably bowed and attached by coils to transverse studs $f$, upon arms $g$, as shown in the drawings. The arms $g$ are all of an equal length, and are secured, at regular distances apart, to the transverse beam $a$ of the main frame, so as to project forward thereof. These rake-teeth are attached to the forward ends of the arms $g$, so as to allow a fork (which I shall hereinafter describe) to rise over the hay gathered upon the rake, and drop down in rear thereof, in a position to remove this hay when said fork advances.

Figure 1:
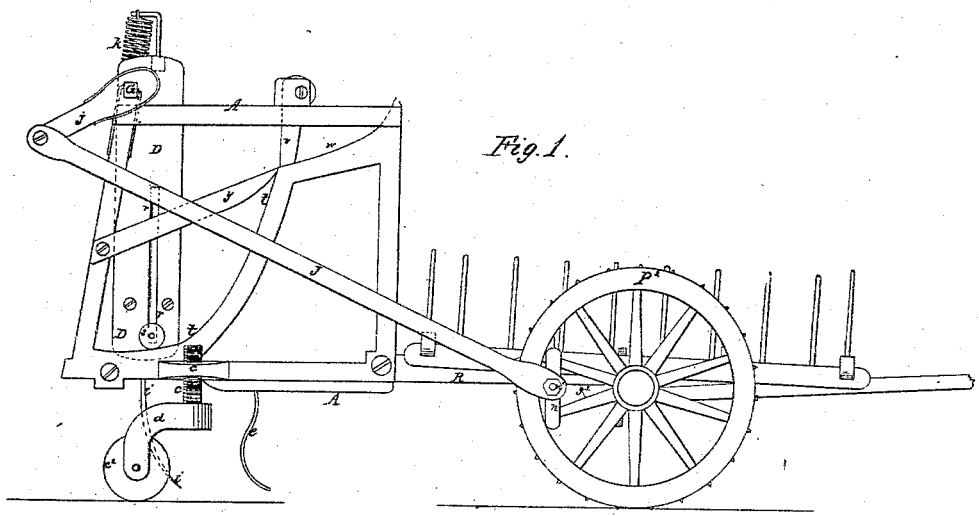
Figure 1 is an elevation of one side of the improved hay-raker and loader applied to a cart.

In front of the rake-teeth, and projecting perpendicularly from the front beam $b$, are rods or teeth $h$, which are arranged at regular distances apart, and extended upward as high as the side-pieces of the main frame. Collectively, these rods or teeth $h$ form a clearer for discharging the load from the fork into a wagon. The fork-teeth $i\ i$ are designed for removing the hay gathered upon the rake-teeth from these teeth, elevating the hay, and, with the aid of the clearer, delivering it into the body of a wagon arranged in front. The fork-teeth are curved, as shown, and secured, at regular distances apart, to the horizontal transverse bar of a rectangular reciprocating frame, C, so that said teeth will work between the teeth of the rake and clearer. This frame C is applied to two vertically-vibrating arms, D D, so as to slide freely in grooves made in the inner sides of these arms, and in a direction with their length. Arms D D are secured at their upper ends to a horizontal oscillating-shaft, G, which is supported in bearings upon the upper ends of the sides A A of the main frame, and which carries on one end an arm, $j$, to which is attached a pitman-rod, J. This pitman-rod receives motion from one of the wheels of the cart or wagon in front, as will be hereinafter described, and communicates an oscillating motion to shaft G. The frame C is also attached to the rock-shaft G by means of a spring, $k$, or its equivalent, as shown in figs. 2 and 3. Oblong slots $r$ are made through the arms D D, in line with the grooves in these arms, through which slots short studs project, that are fastened to frame C, and that carry, on the outer sides of said arms, anti-friction rollers $s\ s$. These rollers are acted upon in the forward movement of the arms D by means of the inclined and curved eccentric ways $t\ t$, and pivoted pendent guides $v\ v$ applied to the sides A of the main frame, against which ways and guides the said rollers are pressed by the spring $k$, as shown in figs. 1 and 4.

When, during the upward movement of the arms D, the rollers $s$ are raised above the guides $v\ v$, the spring $k$ will instantly thrust the fork-frame C forward, as shown in figs. 2 and 3, and thus bring the fork over the clearer $h$. During the descent and return movement of the fork, the rollers $s\ s$ are first brought down upon the inclined ways $w\ w$. They then pass beneath the pivoted guides $v\ v$, and over the guides $y\ y$ to notched spaces $y'\ y'$, which allow the spring $k$ to force the fork-frame down to the position shown in fig. 1, in which position the teeth of the fork are in rear of the rake, ready to remove the gathered load therefrom. The pivoted inclined guides $y$ rise and allow the rollers $s$ to pass upward in the ascent of the fork, and then fall back to their places again, to allow said rollers to pass over them in the descent of the fork. When the fork is rising, with its load of hay gathered from the rake-teeth, the ways $t\ t$ and guides $v\ v$ press it backward, so that its load will rise in rear of the clearer $h$. Then, when the fork is elevated high enough to clear the upper ends of the teeth $h$, it is thrust forward and depressed, thus allowing its load to be discharged by the said clearer. The fork in receding is forced upward by the inclined ways $w$ and inclined guides $y$, with respect to arms D, until arms D are brought in vertical positions, when the fork is depressed and brought in rear of the load of hay which was gathered upon the rake during the last discharging-operation.

The frame of the machine, which I have above described, is attached to the axle P of a wagon or cart by means of a central beam or pole, $P^1$, which projects from and is rigidly secured to the front beam $b$ of said frame. The front end of the pole $P^1$ has an eye, $l$, pivoted to it, so as to swivel, which eye receives a pin, $m$, that is secured to the axle P, and is held down in place on this pin by means of a nut, as shown in figs. 2 and 3. On each side of the pole $P^1$, and projecting from the beam $b$, is an arm, R, carrying on its front end an anti-friction roller, $g^2$, which bears against a vertical strip, $R'$, on the axle P. The two arms R R, with their rollers, serve as stays for keeping the frame of the raker and loader always in line with the wagon or cart to which said frame is attached, while the loose attachment of the pole $P^1$ to axle P will allow the raker and loader-frame to accommodate itself to the ground passed over. To one of the transporting-wheels, $P^2$, of the cart or wagon a clamp, $n$, is applied, from which projects a wrist-pin, $n'$, receiving upon its outer end the front end of the pitman-rod J. In this way one of the cart-wheels serves as a driving-wheel for moving the fork. As it will be necessary to detach the raker and loader from the cart when this cart is to be used for other purposes, I construct the clamp $n$ of two detachable plates, with recesses in them for receiving the spokes, and confine these two plates in place upon the spokes of said wheel by means of the pin $n'$, which has a screw-thread cut upon it that is tapped through said plates, so as to bind and hold them together, as clearly shown in fig. 6. This will allow the removal of the clamp $n$ from the wheel $P^2$ at pleasure.

Having described my invention, what I claim as new, and desire to secure by Letters Patent, is—

1. The combination of a fork, having a vibrating and reciprocating motion, with a hay-rake and a clearer, substantially as described.

2. So arranging and supporting a hay-fork, which vibrates about a horizontal axis, that this fork shall remove the hay, gathered by a rake, from this rake, and, after the delivery of its load upon a wagon, it shall rise over and arrange itself in rear of the load which was gathered upon the rake during said delivery-movement, substantially as described.

3. The arrangement of the rake-teeth upon arms projecting from beam $a$, in combination with means which will cause the fork to rise over the load gathered upon the rake during the delivery-movement of the fork, substantially as and for the purposes described.

4. Providing a frame, carrying hay-raking and loading-devices, with a pole, $P^1$, and two steadying-arms, R R, the latter carrying on their front end rollers $g^2$, for the purpose and in the manner substantially as described.

A. J. PRESTON.

Witnesses:
G. H. TALCOTT,
T. S. TARBELL.